(12) United States Patent
Lee

(10) Patent No.: US 6,192,174 B1
(45) Date of Patent: Feb. 20, 2001

(54) WAVELENGTH SELECTION SWITCHES FOR OPTICAL APPLICATION

(75) Inventor: Ho-Shang Lee, El Sobrante, CA (US)

(73) Assignee: Dicon Fiberoptics, Inc., Berkeley, CA (US)

( * ) Notice: Under 35 U.S.C. 154(b), the term of this patent shall be extended for 0 days.

(21) Appl. No.: 09/469,196

(22) Filed: Dec. 21, 1999

(51) Int. Cl.$^7$ ........................................ G02B 6/26
(52) U.S. Cl. ............................................. 385/24
(58) Field of Search .............................. 385/24; 359/127, 359/128, 117

(56) References Cited

U.S. PATENT DOCUMENTS 5,751,868 * 5/1998 Bala et al. ........................... 385/16
5,915,051 * 6/1999 Damask et al. ..................... 385/16

OTHER PUBLICATIONS

"Optical Restorable WDM Ring Network Using Simple Add/Drop Circuitry," B. Glance et al., *Journal of Lightwave Technology*, vol. 14, No. 11, Nov. 1996, pp. 2453–2456.

"Arrayed–Waveguide Grating Multiplexer with Loop–Back Optical Paths and Its Applications," Y. Tachikawa et al., *Journal of Lightwave Technology*, vol. 14, No. 6, Jun. 1996, pp. 977–984.

* cited by examiner

Primary Examiner—Hung N. Ngo
(74) Attorney, Agent, or Firm—Skjerven Morril MacPherson LLP

(57) ABSTRACT

At least one filter may be employed between two input channels and two output channels to selectively switch wavelengths of radiation between the input and output channels. In one configuration, a switch member having two different filters thereon is moved between two positions. In the first position, all of the wavelengths carried by a first input channel are reflected or transmitted through a first filter at the switch member to one of two output channels, and radiation of an additional wavelength is conveyed from a second input channel to the remaining output channel. When the switch member is moved to a different second position, the radiation from the input channels impinge on the second filter which causes all of the wavelengths except one from the first input channel to be conveyed to the one of the two output channels along with radiation of the additional wavelength from the second input channel that causes radiation of the one wavelength that is not conveyed to the one output channel to be conveyed to the remaining output channel. In a first embodiment, the filters may be coatings on a switch member. In a second embodiment, instead of using a switch member with filters thereon, the filters may be coatings in the input or output channels and the switch member may be simply a prism that deflects the radiation between the input and output channels.

17 Claims, 5 Drawing Sheets

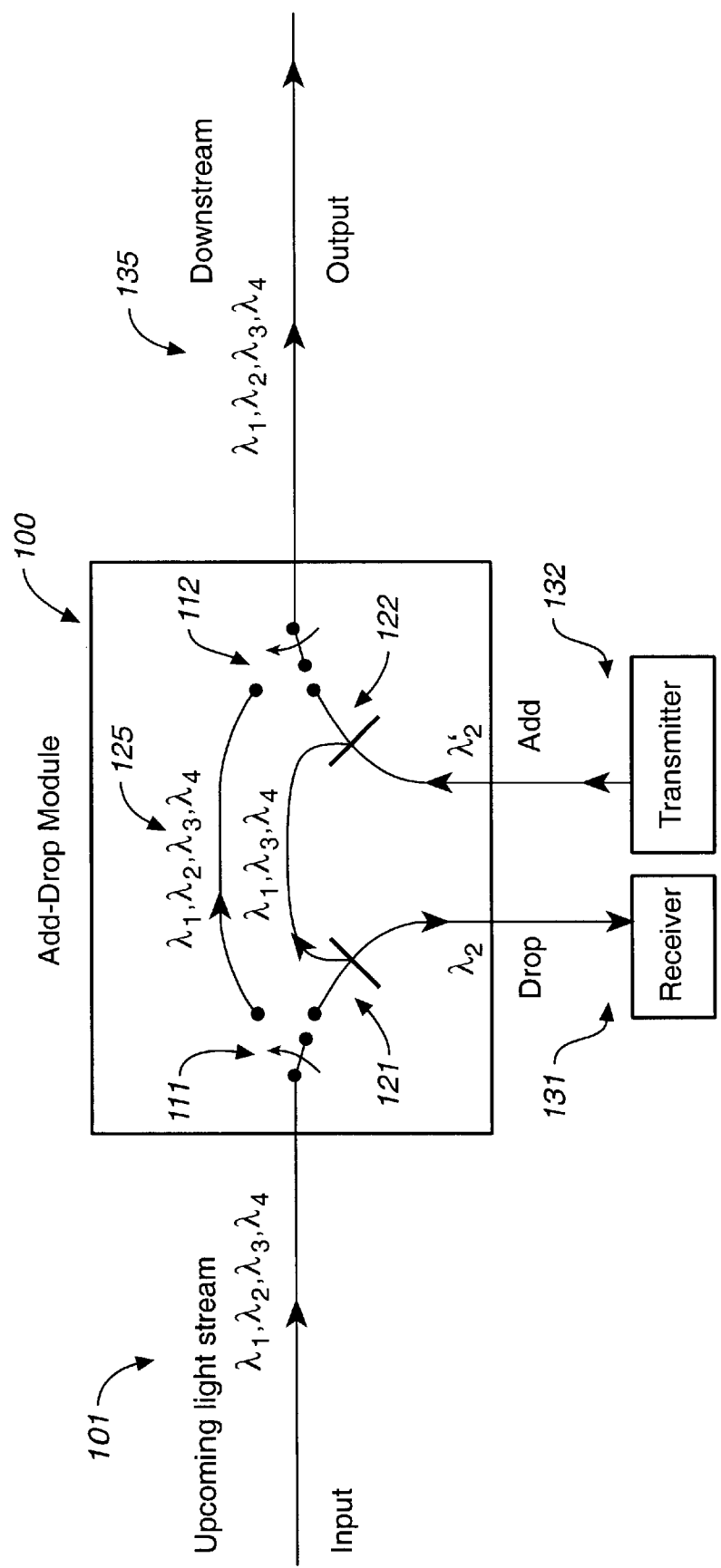
FIG._1 *(PRIOR ART)*

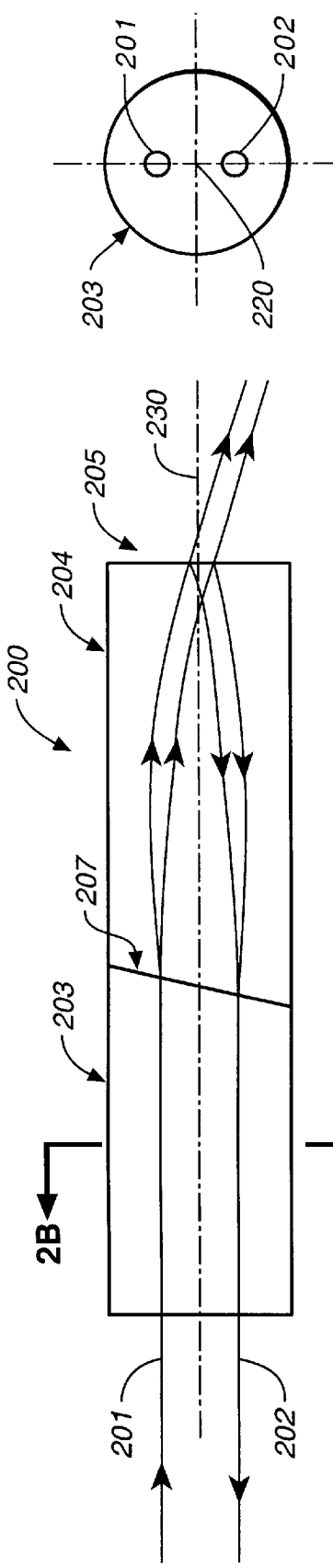
FIG._2A
FIG._2B
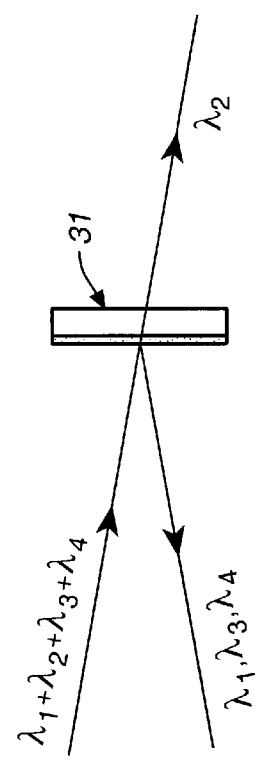
FIG._3B
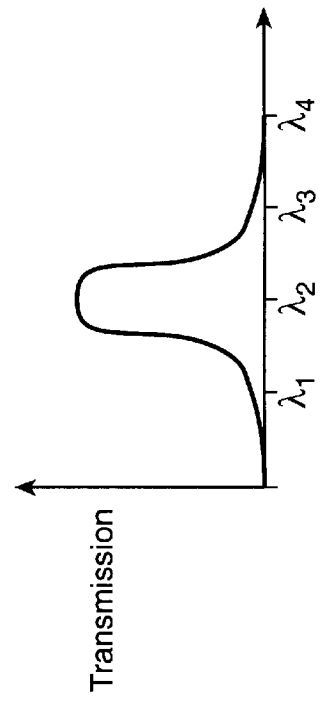
FIG._3A

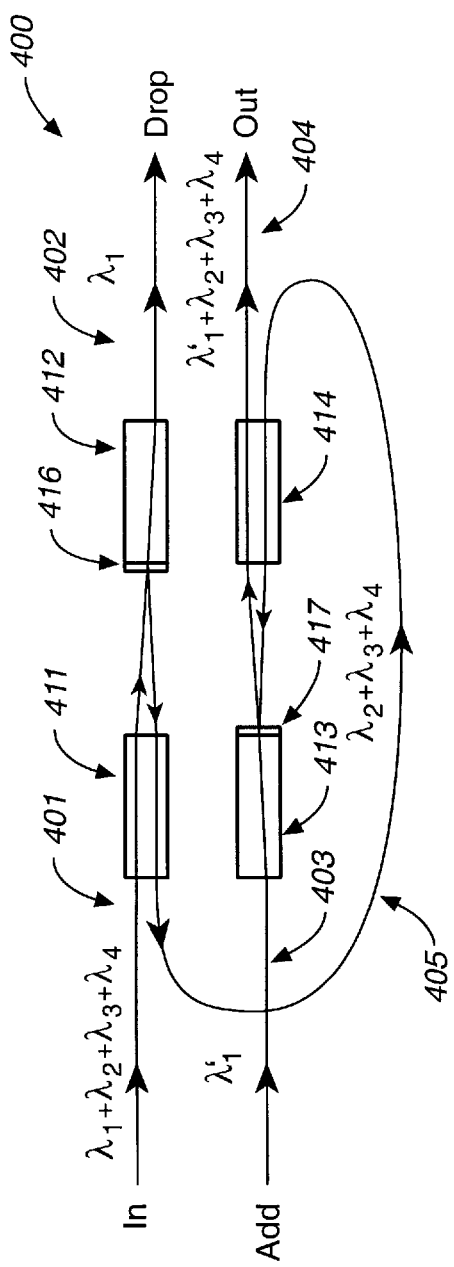
FIG._4A
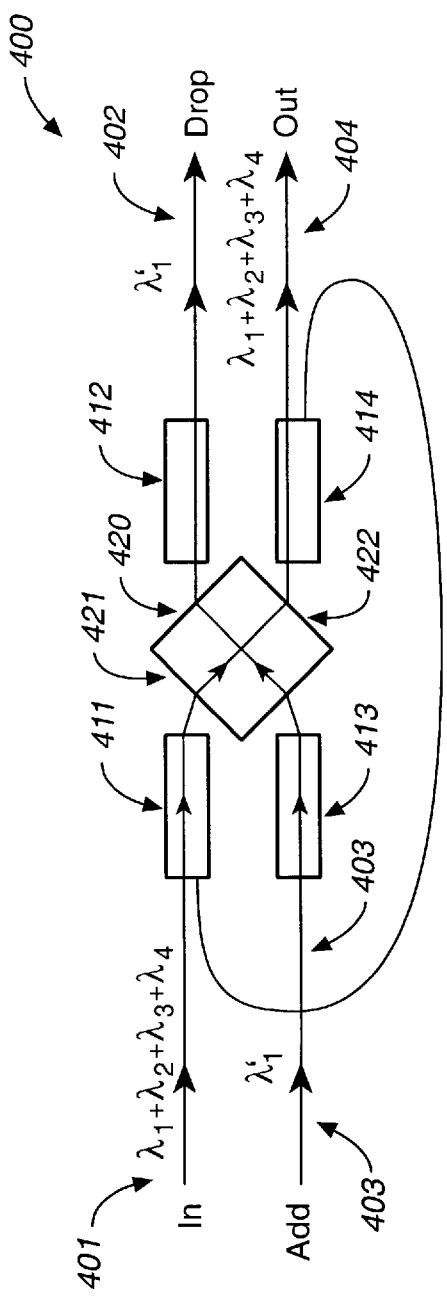
FIG._4B

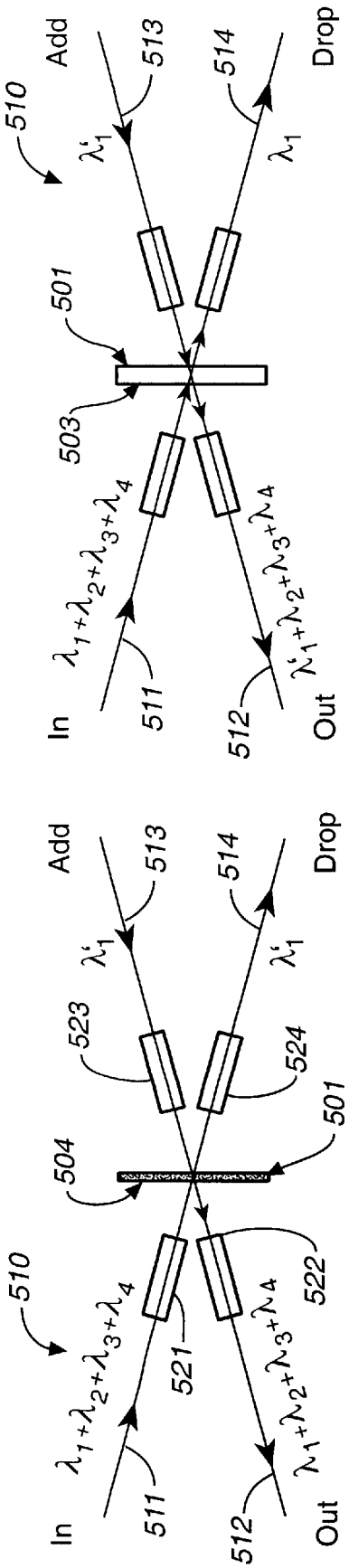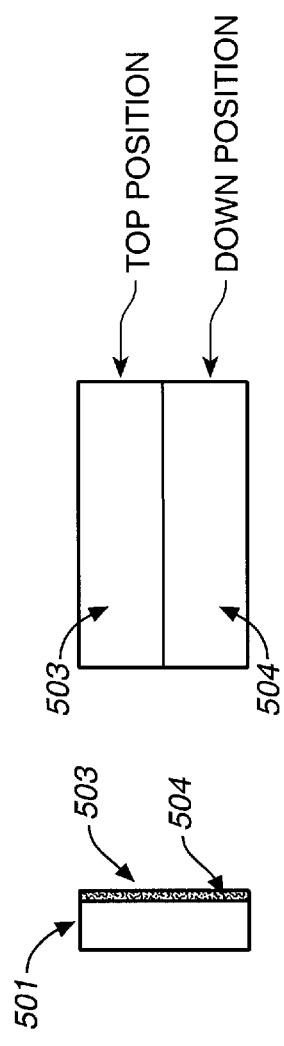
FIG._5A DOWN POSITION
FIG._5B TOP POSITION
FIG._5C
FIG._5D

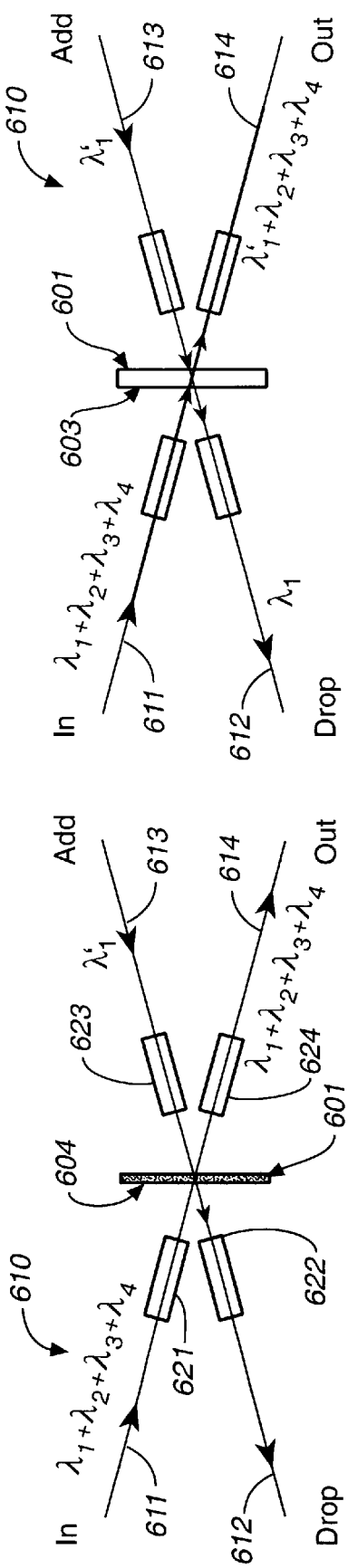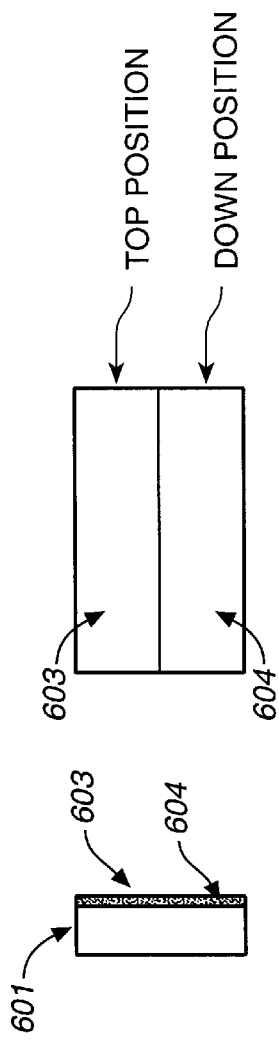
FIG._6B TOP POSITION
FIG._6A DOWN POSITION
FIG._6C
FIG._6D

WAVELENGTH SELECTION SWITCHES FOR OPTICAL APPLICATION

BACKGROUND OF THE INVENTION

This invention relates in general to optical communication and, in particular, to wavelength selection switches for optical application.

As multiple forms of communication traffic continue to place increasingly heavy burdens on fiber optic networks, users are looking for innovative ways to push more data through existing fiber. Dense Wavelength Division Multiplexing (DWDM) offers a state-of-the art alternative for increasing the transmission capabilities of fiber networks using optical technology. DWDM allows multiple streams of data to share a common communications channel by placing data streams onto different wavelengths. The result is a dramatic increase in the amount of bandwidth provided by a single optical fiber.

DWDM evolved from WDM (wave division multiplexing), which began as a dual-channel 1310/1550 nanometer (nm) system. Originally, this approach led to doubling of traffic capacity. DWDM increases the channel density up to 40 separate optical wavelengths, thus significantly increasing the net fiber capacity.

For a fiber optic network architecture using DWDM, it is necessary to route and switch optical signals based on their wavelength in order to optimize data traffic usage. Dropping signal from and adding signals back to the optical network is a rudimentary building block for an optical network architecture. FIG. 1 illustrates the functionality and building elements for a conventional Add-Drop Module (AMD) 100. As an example, four wavelengths $\lambda_1$, $\lambda_2$, $\lambda_3$ and $\lambda_4$ carried along the input port 101 arrive at the Add-Drop Module 100. The AMD consists of two optical switches, 111 and 1 12, and two Wavelength Division Multiplexers (WDM) 111, 112. In the normal ( default ) operation, the switch 111 and switch 112 are connected to the DROP WDM 121 and Add WDM 122, respectively. The wavelength $\lambda_2$ passes through the WDM 121 and arrive at the Drop port 131. The remaining three wavelengths, $\lambda_1$, $\lambda_3$ and $\lambda_4$ are reflected by the WDM 121 and reflected again by WDM 122. Then these three wavelengths are directed to the Output Port 135 by the switch 122. Meanwhile, a new data signal in the same wavelength of $\lambda_2'$ transmitted from Add Port 132 is added back to the network through port 132 and WDM 122 and appears at Output Port 135.

In the faulty case such as failure of Receiver or Transmitter in the Add-Drop ports, the two switches are toggled to be connected to the Express Path 125. In this case the incoming light stream flows through the ADM 100 without interruption.

While the above-described Add-Drop module 100 may be satisfactory for some optical network applications, with the continual reduction in size of optical components in optical network applications, it may be desirable to provide an Add-Drop module which is smaller, cheaper and with better performance. The present invention reduce the numbers of components and cost in an Add-Drop module and further improve its optical performance in insertion loss.

SUMMARY OF THE INVENTION

This invention is based on the observation that, by making use of filters that selectively passes and reflects radiation of different wavelengths, it is possible to reduce the number of components as well as the overall size of the Add-Drop module.

Thus, one embodiment of the invention is directed towards an apparatus for transmitting radiation of multiple wavelengths. A first input channel carries radiation of one or more wavelengths and a second input channel carries radiation of a first wavelength to be added. At least one filter is placed between the channels. When a switch member is placed in a first position between the channels, radiation carried by the first input channel is received by an output channel and the radiation of the first wavelength carried by the second input channel is received by another output channel. When the switch member is in the second position between these channels, at least some of the radiation carried by the two input channels impinges on at least one filter. This causes radiation of all but one of the wavelengths carried by the first input channel and the radiation of the first wavelength to be directed towards a first one of the two output channels and radiation of the wavelength carried by the first input channel but not received by the first output channel be directed towards the remaining output channel.

BRIEF DESCRIPTION OF THE DRAWINGS

FIG. 1 is a schematic diagram of an Add-Drop module, input and output channels and of a receiver and transmitter to illustrate a conventional wavelength selection switching scheme.

FIG. 2A is a cross-sectional view of a ferrule and a GRIN lens useful for illustrating the invention.

FIG. 2B is a cross-sectional view of the applicable component in FIG. 2A along the line 2B—B in FIG. 2A.

FIG. 3A is a graphical plot of a typical spectrum characteristic of a band pass filter.

FIG. 3B is a schematic view of an optical filter illustrating the function of the filter of FIG. 3A in wavelength selection.

FIG. 4A is a schematic diagram of a wavelength selection switch in the "Bar" state to illustrate an embodiment of the invention.

FIG. 4B is a schematic view of the switch FIG. 4A in the "Cross " state.

FIG. 5A is a schematic view of a wavelength selection switch in the "Cross" state to illustrate another embodiment of the invention.

FIG. 5B is a schematic view of the switch of FIG. 5A in the "Bar " state.

FIG. 5C is a front view of the switch element of FIGS. 5A and 5B to illustrate the invention.

FIG. 5D is a side view of the switch element of FIGS. 5A and 5B to illustrate the invention.

FIG. 6A is schematic view of a wavelength selection switch in the "Cross" state to illustrate yet another embodiment of the invention.

FIG. 6B is a schematic view of the switch of FIG. 6A but in the "Bar " state.

FIG. 6C is a front view of the switch element in the embodiment of FIGS. 6A and 6B.

FIG. 6D is a side view of the switch element in the embodiment of FIGS. 6A and 6B.

DETAILED DESCRIPTION OF THE EMBODIMENTS

FIG. 2A shows a two-fiber collimator 200. Two fibers, 201 and 202, are embedded in a glass ferrule 203. Its cross sectional view is indicated in FIG. 2B. The centers of two fibers are slightly off the center 220 of the glass ferrule 203. The light or radiation (herein below referred to as light for simplicity) exiting the fiber end 207 of the fiber 201 is collimated by the Gradient Index (GRIN) lens 204. As the well collimated beam meets the surface 205 of the GRIN lens 204, some of light is transmitted as output beam 230 and the remainder is reflected by either Fresnel reflection or an optical coating on the surface 205. The reflected light is coupled back to the fiber 202.

FIG. 3B shows the wavelength selection by a filter that may be used in the embodiments described below. The filter is deposited onto the surface of a glass substrate 31. FIG. 3A shows a typical spectrum characteristic of a band pass filter such as the one in FIG. 3B, although a filter with a typical spectrum characteristic of an edge filter may be used instead and is within the scope of the invention.

FIG. 4A shows that the wavelength switch is in the "Bar state". Four channels are employed in the switch 400, input channels 401, 403, and output channels 402, 404. Each of the channels may include an optical fiber. The input fiber 401 of FIG. 4A carries four wavelengths for example. The light is collimated by a GRIN lens 411. The beam hits a filter 416, which is appended to or directly coated onto the end surface of GRIN lens 412 as shown in FIG. 4A (or onto the end surface of GRIN lens 411 facing lens 412, which is not shown in the figures). The filter 416 passes the wavelength $\lambda_1$, which is to be coupled to Drop output fiber 402 by the GRIN lens 412, and reflects the remaining other three wavelengths, $\lambda_2$, $\lambda_3$, and $\lambda_4$. The three reflected wavelengths are transmitted inside the fiber 405 which may or may not pass through lens 411 and then is collimated by the GRIN lens 414. The collimated beam is reflected by a second filter 417 and re-enter GRIN 414 and is coupled to the output fiber 404. Filter 41.7 is appended to or directly coated onto the end surface of GRIN lens 413 as shown in FIG. 4A (or onto the end surface of GRIN lens 414 facing lens 413, which is not shown in the figures).

The wavelength $\lambda_1'$ carried by the "add" input fiber port 403 passes through the second filter 417 and is then coupled to the "Output" output fiber port 404.

FIG. 4B shows that the wavelength switch in the "Cross" state. A prism 420 is inserted into the optical paths. The prism 420 is used to detour the optical paths. The collimated beam exiting the GRIN lens 411 hits the first surface 421 of the Prism 420. Because refraction index of the Prism is higher than the surrounding medium such as air, the beam is deflected by refraction, passes the prism and exits the second surface 422 of the prism, and is then collimated by GRIN lens 414 and transmitted to output filer 404. The second surface 422 is not necessarily in parallel to the first surface 421. Thus, in the "Cross" state, all of the wavelengths in the input channel 401 are transmitted to the output channel 404. All of the wavelength(s) in the input channel 403 are transmitted to the output channel 402 through prism 420 again by deflection. The prism may be moved into the position between the channels as shown in FIG. 4B by any conventional means such as a motor (not shown) from a position (not shown in FIG. 4A) not between the channels.

In order to deflect the beam exiting lens 41 1 towards lens 414, the higher is the index of refraction of prism 420, the smaller can be the size of the prism. Higher index glass having excellent transparency such as F7, manufactured by Schott Inc., located at 400 York Ave., Duryea, Pa. 1864, is a good candidate for the material of the prism. Silicon, with an index of refraction of about 3.4 and good transparency for the near-infrared, is an excellent material for the prism in the present invention. Germanium may be another material that can be used for the prism 420. Preferably the prism is made of a material having an index of refraction not less than about 3.

The connection between the input port 401 and the output port 404 is called "Express Path". In the optical network, the low insertion loss for the Express Path is strongly desired. In the present invention, in the "Cross" state, the light signal goes from the input port 401 to the Output port 404 straight without going through any filter. Thus, the advantage of putting the filters on the end faces of lenses 412, 413 rather than those of lenses 411, 414 is that, in the "Express Path" in the "Cross" state, the light signal goes from the input port 401 to the Output port 404 straight without going through any filter. In comparison to the optical configuration in FIG. 1, the present invention reduces the number of discrete components from 4 to one. It significantly decreases the cost and size. Because the optical signal passes through fewer components, the insertion loss is reduced also.

The smaller is the diameter of GRIN lenses, the smaller can be the spacing between input port 401 and Add Port 403. The size of Prism 420 can be therefore reduced. And so does the overall size of the device. The diameter of GRIN lens can be as small as 0.5 mm or less.

In the "Cross" state, the Add port 403 is connected to the Drop port 402 through the Prism 420.

Yet another embodiment is shown in FIGS. 5A–5D, where a switch member having two filters is used as a wavelength selective mechanism (a mirror in this case) to route the signals. As indicated in FIG. 5D, a bandpass (or edge) filter 503 in the top position and a broadband highly reflective coating 504 in the down position are coated onto or attached to a radiation transmissive (with respect to the wavelengths of radiation conveyed between the input and output channels) substrate 501. The bandpass filter 503 allows at least one wavelength, $\lambda_1$ for example in FIG. 5A and 5B, to go through the filter and reflects other wavelengths from the upstream signal in input fiber 511. The broadband highly reflective coating 504 in the down position is designed to reflect all wavelengths in the signal stream from input 511. The orientation of two coating types is not necessary in top and down arrangement. Left-and-right arrangement is also covered in the present invention.

FIG. 5A shows a wavelength selective switch 510 at its up position where coating 504 is in the optical paths of input beams from input fibers 511, 513. The input fiber 511 carries 4 wavelengths, $\lambda_1$, $\lambda_2$, $\lambda_3$, and $\lambda_4$, which are collimated by the GRIN lens 521. The beam strikes the reflective coating surface 504 when the substrate is in the up position. The 4 wavelengths are reflected and coupled to the Output fiber 512 through GRIN lens 522. A signal wavelength $\lambda_1'$ from input fiber 513 is also reflected at the reflective coating surface 504 and then coupled to the Drop output port 514. The GRIN lenses used for the beam collimation can be avoided if the fiber ends of four fibers 511, 512, 513 and 514 are brought closely enough or the fiber ends are tapered to expand the beam.

In the down position as shown in FIG. 5B, filter 503 is in the optical paths of input beams from input fibers 511, 513. Wavelength $\lambda_1$ of 4 wavelengths carried by the input fiber 511 goes through the bandpass or edge filter 503 and then enters the Drop port 514. The remaining three wavelengths, $\lambda_2$, $\lambda_3$, and $\lambda_4$ are reflected by the coating 503 to enter the Output port 512. In the mean time, the signal $\lambda_1'$ carried by the Add port 513 also goes through the coating 503 and is added to the three wavelengths, $\lambda_2$, $\lambda_3$, and $\lambda_4$ in Output port 512.

FIG. 6A shows another wavelength selective switch 610 at its up position where coating 604 is in the optical paths of input beams from input fibers 611, 613. The input fiber 611 carries 4 wavelengths, $\lambda_1, \lambda_2, \lambda_3$ and 4, which are collimated by the GRIN lens 621. The beam strikes the transmissive coating 604 when the substrate is in the up position. The 4 wavelengths are transmitted and coupled to the Output fiber 614 through GRIN lens 624. A signal wavelength $\lambda_1'$ from input fiber 613 is also transmitted by the coating 604 and then coupled to the Drop output port 612. Alternatively, coating 604 may simply a radiation transmissive portion of the substrate 601 so that no additional coating 604 is needed. The GRIN lenses used for the beam collimation can be avoided if the fiber ends of four fibers 611, 612, 613 and 614 are brought closely enough or the fiber ends are tapered to expand the beam.

In the down position as shown in FIG. 6B, filter 603 is in the optical paths of input beams from input fibers 611, 613. Wavelength $\lambda_1$ of 4 wavelengths carried by the input fiber 611 is reflected by the bandpass or edge filter 603 and then enters the Drop port 612. The remaining three wavelengths, $\lambda_2, \lambda_3,$ and $\lambda_4$ are transmitted by the coating 603 to enter the Output port 614. In the mean time, the signal $\lambda_1'$ carried by the Add port 613 is reflected by the coating 603 and is added to the three wavelengths, $\lambda_2, \lambda_3,$ and $\lambda_4$ in Output port 614.

While the invention has been described above by reference to various embodiments, it will be understood that changes and modifications may be made without departing from the scope of the invention, which is to be defined only by the appended claims and their equivalents.

What is claimed is:

1. An apparatus for transmitting radiation of multiple wavelengths, comprising:
    a first input channel carrying radiation of one or more wavelengths;
    a first output channel;
    a second input channel carrying radiation of a first wavelength to be added;
    a second output channel for receiving radiation of at least one wavelength that is to be dropped; and
    a switch member with two filters between the channels, wherein the switch member is movable between two different positions between the channels, wherein when the member is in a first position, the radiation carried by the first and second input channels impinges on the first filter and when the member is in a second position, the radiation carried by the first and second input channels impinges on the second filter, said two filters being such that the first output channel receives all of the wavelengths except one in the radiation carried by the first input channel and the radiation of the first wavelength, and the second output channel receives the radiation of the one wavelength carried by the first input channel not received by the first output channel.

2. The apparatus of claim 1, said first output channel being substantially aligned with the first input channel and the second output channel being substantially aligned with the second input channel.

3. The apparatus of claim 1, said first output channel being substantially aligned with the second input channel and the second output channel being substantially aligned with the first input channel.

4. The apparatus of claim 1, said first filter passing radiation of wavelengths in the two input channels and said second filter passing all of the wavelengths except for one wavelength in the radiation carried by the first input channel and reflecting radiation of such one wavelength and of the first wavelength.

5. The apparatus of claim 1, said first filter reflecting radiation of wavelengths in the two input channels and said second filter passing radiation of one wavelength but reflecting radiation of all of the remaining wavelengths carried by the first input channel and passing radiation of such one wavelength and of the first wavelength.

6. An apparatus for transmitting radiation of multiple wavelengths, comprising:
    a first input channel carrying radiation of one or more wavelengths;
    a first output channel substantially aligned with the first input channel;
    a second input channel carrying radiation of a first wavelength to be added;
    a second output channel substantially aligned with the second input channel for receiving radiation of at least one wavelength that is to be dropped; and
    a switch member with at least one filter between the channels, wherein the switch member is movable between two different positions between the channels, wherein when the member is in a first position, the radiation carried by the first and second input channels impinges on a radiation transmissive portion of the member at a location away from the filter, and when the member is in a second position, the radiation carried by the first and second input channels impinges on the filter, said filter passing all of the wavelengths except for one wavelength in the radiation carried by the first input channel and reflecting radiation of such one wavelength and of the first wavelength.

7. The apparatus of claim 1, wherein each of said channels includes a GRIN lens.

8. The apparatus of claim 1, wherein separation between the channels is not more than about 1 mm.

9. An apparatus for transmitting radiation of multiple wavelengths, comprising:
    a first input channel carrying radiation of one or more wavelengths;
    a first output channel;
    a second input channel carrying radiation of a first wavelength to be added;
    a second output channel for receiving radiation of at least one wavelength that is to be dropped;
    a first and a second filter between the channels;
    a conveying channel between the two filters; and
    a switch member movable between two different positions between the channels, wherein when the member is in a first position, the radiation carried by the first and second input channels is transmitted respectively to the first and second output channels, and when the member is in a second position, said first filter passes radiation of one wavelength in the radiation carried by the first input channel to the second output channel and reflects the remaining wavelengths through the conveying channel to the second filter, said second filter reflecting the radiation of the first wavelength and radiation from the conveying channel to the first output channel.

10. The apparatus of claim 9, said first output channel being substantially aligned with the second input channel and the second output channel being substantially aligned with the first input channel.

11. The apparatus of claim 10, said second filter being located between said first output channel and the second input channel, and said first filter being located between the second output channel and the first input channel.

12. The apparatus of claim 9, said switch member including a prism.

13. The apparatus of claim 12, said prism made of a material including silicon or germanium.

14. The apparatus of claim 12, said prism made of a material having an index of refraction not less than about 3.

15. The apparatus of claim 9, wherein each of said channels includes a GRIN lens.

16. The apparatus of claim 9, wherein separation between the channels is not more than about 1 mm.

17. An apparatus for transmitting radiation of multiple wavelengths, comprising:
- a first input channel carrying radiation of one or more wavelengths;
- a first output channel;
- a second input channel carrying radiation of a first wavelength to be added;
- a second output channel for receiving radiation of at least one wavelength that is to be dropped;
- at least one filter between the channels; and
- a switch member placed at two different positions between the channels so that when the member is in a first position, the radiation carried by the first input channel is received by the first output channel and the radiation of the first wavelength carried by the second input channel is received by the second output channel, and when the member is in a second position, at least some of the radiation carried by the first and second input channels impinges on the at least one filter, so that radiation of all but one of the wavelengths carried by the first input channel and the radiation of the first wavelength is received by the first output channel, and the radiation of the one wavelength carried by the first input channel not received by the first output channel is received by the second output channel.

* * * * *